(12) United States Patent
Panchanathan et al.

(10) Patent No.: US 9,626,332 B1
(45) Date of Patent: Apr. 18, 2017

(54) RESTORE AWARE CACHE IN EDGE DEVICE

(71) Applicant: EMC Corporation, Hopkinton, MA (US)

(72) Inventors: Balaji Panchanathan, Bangalore (IN); Arun Sambamoorthy, Bangalore (IN); Satchidananda Patra, Bangalore (IN); Pravin Kumar Ashok Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 663 days.

(21) Appl. No.: 14/101,091

(22) Filed: Dec. 9, 2013

(51) Int. Cl.
*G06F 15/16* (2006.01)
*G06F 15/173* (2006.01)

(52) U.S. Cl.
CPC .............. *G06F 15/17331* (2013.01)

(58) Field of Classification Search
CPC .................................. G06F 15/17331
USPC ....................... 709/203, 212, 215
See application file for complete search history.

*Primary Examiner* — Hee Soo Kim
(74) *Attorney, Agent, or Firm* — Blakely, Sokoloff, Taylor & Zafman LLP

(57) ABSTRACT

Exemplary methods for providing most frequently referenced data chunks include maintaining, at a central storage server, reference frequency information for each of a first plurality of data chunks currently stored locally. In one embodiment, the methods include determining a plurality of data chunks most frequently referenced by a first of the remote devices based on the frequency reference information associated with the first remote device, and transmitting one or more data chunks of the most frequently referenced data chunks to the first remote device to be cached therein, such that a local client of the first remote device can access the cached data chunks without having to access the central storage server.

24 Claims, 7 Drawing Sheets

RESTORE AWARE CACHE IN EDGE DEVICE

FIELD OF THE INVENTION

Embodiments of the present invention relate generally to networking devices. More particularly, embodiments of the invention relate to providing most frequently referenced data chunks to a remote device.

BACKGROUND

Data storage utilization is continually increasing, causing the proliferation of storage systems in data centers. In particular, the size of the applications and the data generated there from is increasing. Moreover, systems/users are backing up multiple copies of a given set of data to maintain multiple versions. For example, snapshots of a given database stored in a server are copied and stored over time, thereby allowing a given version/snapshot of a set of data to be restored. Thus, a typical client has an abundant amount of data to be backed up. A typical network configuration includes multiple remote devices communicatively coupled to a central backup storage system for backing up their data. At times a disaster recovery must be performed by the remote devices in order to restore data that has been backed up. Given the amount of backed up data, the recovery time can be quite long.

A remote device can increase the restore performance (i.e., reduce the restore time) by including the most frequently referenced data chunks in their local storage unit. A conventional central storage system maintains information indicating the frequency of usage of data chunks. However, the information is not maintained on a per device basis.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
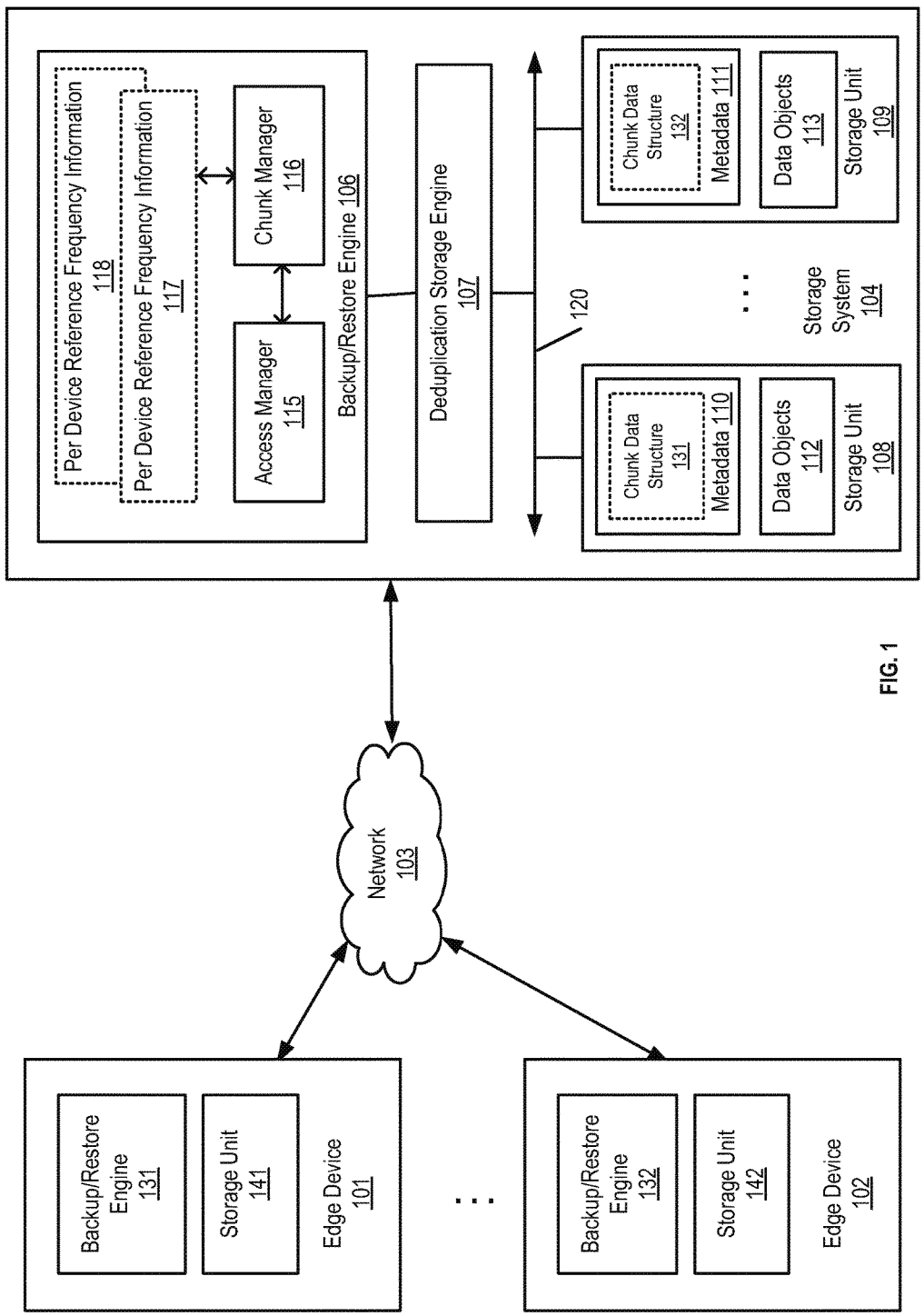
FIG. 1 is a block diagram illustrating a system providing the most frequently referenced data chunks according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A typical network configuration includes multiple clients communicatively coupled to one or more edge devices. The edge devices, in turn, are communicatively coupled to a central storage server/system for backing up their data. In some instances, the edge devices themselves can be backup servers. By way of example, and not limitation, the edge devices (which shall herein be simply referred to as devices) can be configured to be backup servers for their respective local networks. If the backup data exceeds the capacity of these devices, then the additional data can be sent to the central storage system for backup.

In some instances, the devices must perform disaster recovery from the central backup storage system. According to one embodiment, in order to enhance restore performance by reducing the restore time, a device is configured to include a storage unit, which can be persistent or non-persistent (e.g., a cache). The storage unit is configured to store data chunks that are most frequently referenced (i.e., used) by the device. These most frequently referenced data chunks can be used to restore the data without having to access the central backup storage system. For example, if a data chunk stored in the local storage unit is referenced 100 times by the data to be restored, then 100 accesses to the central storage system can be eliminated, thus reducing the overall restore time.

Conventional central storage systems include information indicating which data chunks are most frequently referenced. These conventional central storage systems, however, do not contain reference frequency information on a per device basis. Thus, conventional central storage systems cannot push (i.e., send) data chunks to the devices that are most frequently referenced by the respective devices. The storage system of the present invention overcomes this limitation by maintaining reference frequency information on a per device basis, allowing the storage system to determine which data chunks are most frequently referenced by which device. This determination, in turn, allows the storage system to intelligently push the data chunks that are most frequently referenced (by a device) to that particular device. Various embodiments of the present invention shall become apparent through the discussion of the figures below, in which like reference numbers indicate similar elements.

FIG. 1 is a block diagram illustrating a storage system according to one embodiment of the invention. Referring to FIG. 1, system 100 includes, but is not limited to, one or more edge devices 101-102 communicatively coupled to storage system 104 over network 103. Edge devices (which shall herein be simply referred to as devices) 101-102 may be any type of network devices such as a server (e.g., such as a backup server) that communicatively couples one or more clients (not shown) to a central backup server (e.g., storage system 104). The clients that communicatively couple the an edge device can be any type of network device, for example, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 104 includes one or more network interfaces (not shown) for communicating with other networked devices (e.g., edge devices 101-102). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

According to one embodiment, devices 101-102 include backup/restore engines 131-132, respectively. Backup/restore engines 131-132 are configured to backup data from the clients of the respective local network (not shown) to storage system 104. For example, device 101 can be a backup server located at a first location (e.g., of a first company), configured to backup data for clients (e.g., laptops, personal computers, etc.) of its local network. Edge device 102 can be a backup server located at a second location (e.g., of the first or different company), configured to backup data for clients of its local network (not shown). When the backup data of either local network exceeds the backup capacity of the respective device, the respective backup/restore engine backs up the additional data at storage system 104.

In some instances, backup/restore engines 131-132 must restore backup data from storage system 104 to their respective clients. The recovery time can be quite long, depending on how much backup data must be recovered. According to one embodiment, devices 101-102 include storage units 141-142. Storage units 141 can be persistent or non-persistent (e.g., caches). In one embodiment, storage units 141-142 are configured to store data chunks that are most frequently referenced by the respective device. As used herein, "referencing a data chunk by a device" refers to the referencing of a data chunk by the data that the device is responsible for backing up. Assume, for example, that device 101 backed up a file from its local client to storage system 104, and that the file references 10 data chunks. In this example, these 10 data chunks are considered to be referenced by device 101. Note that a data chunk can be referenced by the same device multiple times (e.g., one or more files of the same device references the same data chunk). Further, the same data chunk can be referenced by two or more different devices (e.g., a file of the first device references a data chunk, and a file of the second device references the same data chunk).

The restore time required by backup/restore engines 131-132 are reduced by the inclusion of the most frequently referenced data chunks in respective storage units 141-142. Assume, for example, that backup/restore engine 131 must restore a Microsoft Word® file that was previously backed up at storage unit 104, and that the Word file references a particular data chunk 100 times (e.g., the same text string is repeated throughout the Word file). If this frequently referenced data chunk is stored in storage unit 141, backup/restore engine 131 can avoid having to access the data chunk from storage unit 104 (e.g., up to 100 different times).

A conventional backup storage system contains information of how many times a data chunk is referenced. A conventional backup storage system does not contain, however, such reference frequency information on a per device basis. Assume, for example, that devices 101-102 are communicatively coupled to a conventional storage system, which contains information that a data chunk is referenced a total of 100 times. The conventional storage system does not, however, contain information indicating how many times the data chunk was referenced by each of devices 101-102. For example, device 101 may reference the data chunk 99 times, and device 102 may only reference that data chunk 1 time. Here, device 101 frequently references the data chunk, but device 102 does not frequently reference that same data chunk.

In the above example, device 101 would greatly benefit by having the data chunk in its storage unit 141. Edge device 102 would not, however, benefit much by having the data chunk in its storage unit 142. A conventional storage system does not have the mechanisms for determining which device to push the data chunk to. Storage system 104 overcomes this limitation by including reference frequency information of data chunks on a per device basis.

In one embodiment, backup/restore engine 106 includes reference frequency information for each device as part of per device reference frequency information (RFI) 117-118. Per device RFIs 117-118 can be implemented, for example, as data structures. By way of illustration, and not limitation, per device RFI 117 can be configured to include reference frequency information for device 101, and per device RFI 118 can be configured to include reference frequency information for device 102. One having ordinary skill in the art would recognize that the present invention is not limited to two per device RFIs as shown. For example, the number of per device RFIs in the system depends on the number of devices that are performing backup to storage system 104.

Figure 2:
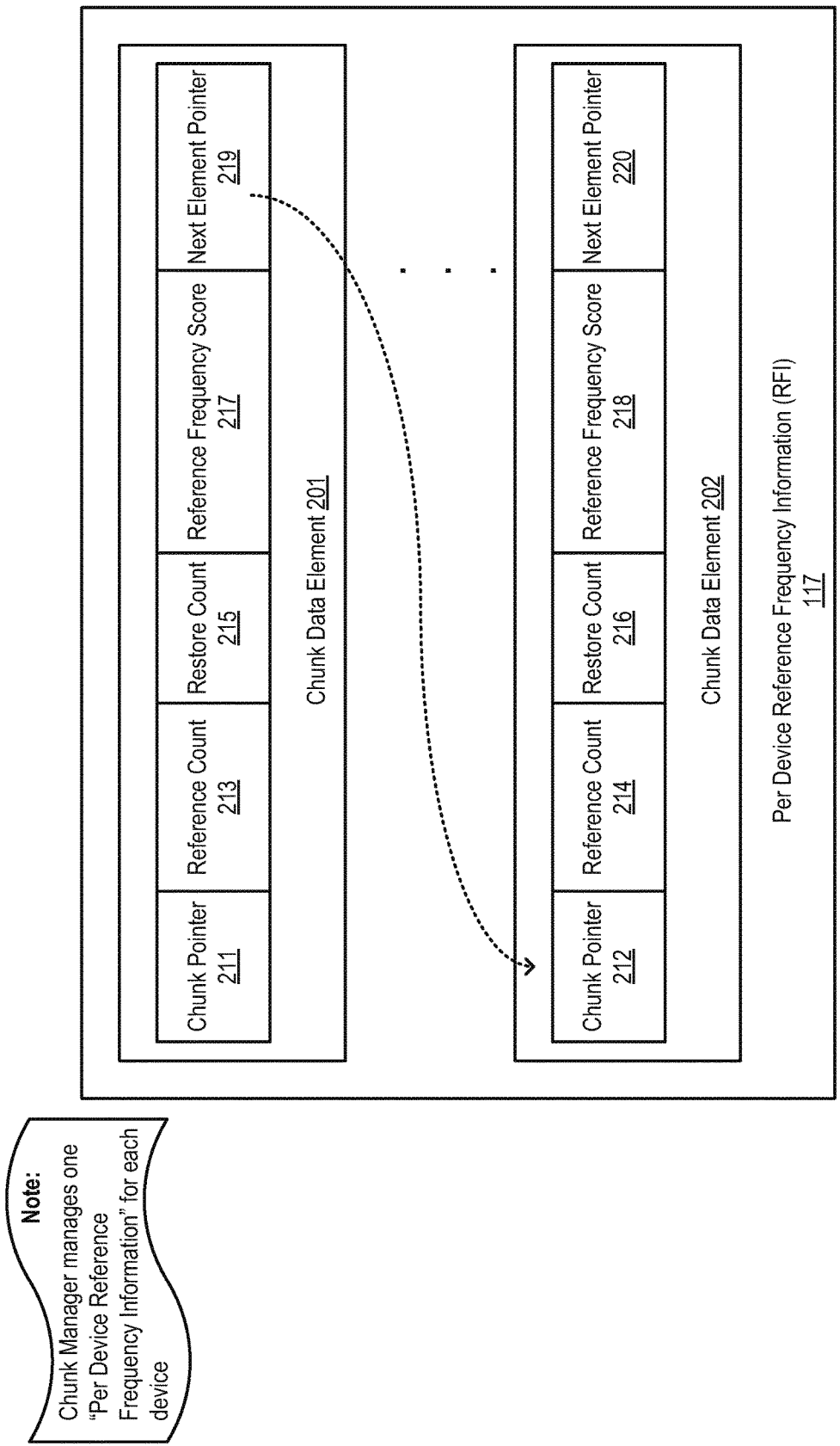
FIG. 2 is a block diagram illustrating a per device reference frequency information data structure according to one embodiment.

FIG. 2 is a block diagram illustrating per device RFI 117 according to one embodiment. In the illustrated embodiment, per device RFI 117 includes chunk data elements 201-202. Each of chunk data elements 201-202 contains information for a particular data chunk stored at storage system 104. In one embodiment, chunk data elements 201-202 include chunk pointers 211-212, respectively. Each of chunk pointers 211-212 contains information pointing to a location in storage where the respective data chunk is stored. Chunk data elements 201-202 also contain reference counts 213-214, respectively. In one embodiment, each of reference counts 213-214 contains information indicating the number of times the respective data chunk is referenced by the edge device. In the illustrated embodiment, chunk data elements 201-202 includes restore counts 215-216, respectively. In one embodiment, restore counts 215-216 contain information indicating the number of times the respective data chunk has been restored by the device.

In the illustrated embodiment, chunk data elements 201-202 include reference frequency scores 217-218, respectively. Reference frequency scores 217-218 contain scores indicating how frequent the respective data chunk is referenced by the device. In one embodiment, reference frequency scores 217-218 are determined based on the reference counts and restore counts of the respective chunk data element. By way of example, and not limitation, reference frequency score 217 can be the product of reference count 213 and restore count 215, and reference frequency score 218 can be the product of reference count 214 and restore count 216. Alternatively, reference frequency score 217 can be the sum of normalized reference count 213 and normalized restore count 215, and reference frequency score 218 can be the sum of normalized reference count 214 and normalized restore count 216. Reference frequency scores 217-218 can be determined based on other information using other mathematical functions without departing from the broader scope and spirit of the present invention.

In one embodiment, chunk data elements 201-202 include next element pointers 219-220, respectively. Each of next element pointers 219-220 contain information pointing to another chunk data element. In this way, the chunk data elements are of each per device RFI "linked" together to create a link list data structure of chunk data elements. For example, next element pointer 219 contains information pointing to the beginning of chunk data element 202. One having ordinary skill in the art would recognize that per device RFI 117 can be implemented using structures other than a link list. For example, each of the chunk data elements can be contiguously located at predefined storage locations. In such an embodiment, next element pointers may not be required.

Although per device RFI 117 is illustrated has having two chunk data elements, one having ordinary skill in the art would recognize that more or less chunk data elements can be included as part of per device RFI 117. For example, the number of chunk data elements in per device RFI 117 depends on the number of data chunks stored at storage system 104. It shall be further understood that chunk data elements 201-202 are not limited to the information as shown in FIG. 2. For example, in some embodiments, reference frequency scores 217-218 may be computed on the fly as each chunk data element is accessed. In such an embodiment, reference frequency scores 217-218 are not required to be included as part of chunk data elements 201-202, respectively.

Referring now back to FIG. 1. In one embodiment, backup/restore engine 106 includes reference frequency information for each device as part of chunk data structures 131-132. One having ordinary skill in the art would recognize that the present invention is not limited to two chunk data structures as shown. In one embodiment, the number of chunk data structures in the system depends on the number of data chunks that are stored at storage system 104. For example, each of the data chunks that are stored at storage system 104 is represented by a chunk data structure. According to one embodiment, each of chunk data structures 131-132 contains reference frequency information for each edge device that is performing backup to storage system 104.

Figure 3:
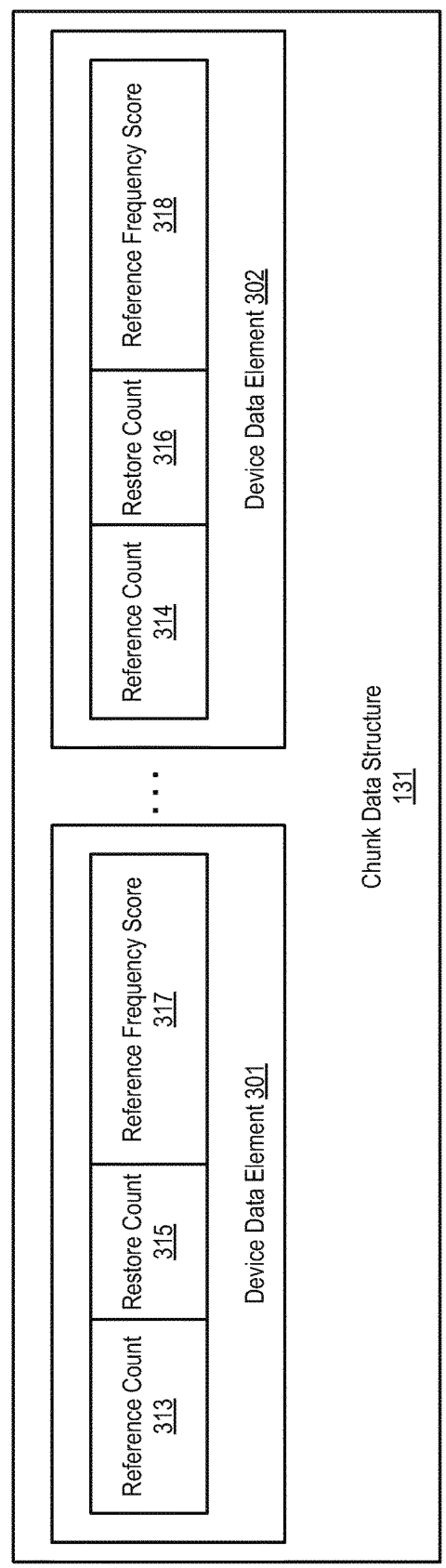
FIG. 3 is a block diagram illustrating a chunk data structure according to one embodiment.

FIG. 3 is a block diagram illustrating chunk data structure 131 according to one embodiment. In the illustrated embodiment, chunk data structure 131 includes device data elements 301-302. It shall be understood that chunk data structure 131 is not limited to two device data elements as shown. In one embodiment, the number of device data elements in chunk data structure 131 depends on the number of edge devices that are performing backup to storage system 104. For example, device data element 301 can contain information indicating how frequently device 101 accesses the data chunk, and device data element 302 can contain information indicating how frequently device 102 accesses the data chunk.

In the illustrated embodiment, device data elements 301-302 include reference counts 313-314, respectively. In one embodiment, each of reference counts 313-314 contain information indicating the number of times the data chunk is referenced by the respective device. For example, reference count 313 can contain information indicating the number of times device 101 references the data chunk, and reference count 314 can contain information indicating the number of times edge device 102 references the data chunk.

In the illustrated embodiment, device data elements 301-302 include restore counts 315-316, respectively. In one embodiment, restore counts 315-316 contain information indicating the number of times the data chunk has been restored by the respective edge device. For example, restore count 315 can contain information indicating the number of times device 101 restored the data chunk, and restore count 316 can contain information indicating the number of times device 102 restored the data chunk.

In the illustrated embodiment, device data elements 301-302 include reference frequency scores 317-318, respectively. In one embodiment, reference frequency scores 317-318 contain scores indicating how frequent the data chunk is referenced by the respective device. In one embodiment, reference frequency scores 317-318 are determined based on the reference counts and restore counts of the respective device data element. By way of example, and not limitation, reference frequency score 317 can be the product of reference count 313 and restore count 315, and reference frequency score 318 can be the product of reference count 314 and restore count 316. Alternatively, reference frequency score 317 can be the sum of normalized reference count 313 and normalized restore count 315, and reference frequency score 318 can be the sum of normalized reference count 314 and normalized restore count 316. Reference frequency scores 317-318 can be determined based on other information using other mathematical functions without departing from the broader scope and spirit of the present invention.

It shall be appreciated that device data elements 301-302 are not limited to the information as shown in FIG. 3. For example, in some embodiments, reference frequency scores 317-318 may be computed on the fly as each device data element is accessed. In such an embodiment, reference frequency scores 317-318 are not required to be included as part of device data elements 301-302, respectively. Further, it shall be understood that other information may be included as part of each device data element, including for example, a chunk pointer (not shown) containing information that points to a location where the respective data chunk is stored.

Per device RFIs 117-118 and chunk data structures 131-132 have been described as mechanisms for maintaining reference frequency of data chunks on a per device basis. Typically, only one mechanism is implemented as part of storage system 104. For example, if per device RFIs 117-118 are implemented, then chunk data structures 131-132 are optional, and vice versa.

Referring again back to FIG. 1. According to one embodiment, backup/restore engine 106 includes access manager 115. Access manager 115 is configured to interface with edge devices (e.g., devices 101-102) for backing up data chunks from the devices to storage units 108-109. Access manager 115 is also configured to retrieve data chunks from storage units 108-109 and providing them to the devices during a restore process. According to one embodiment, access manager 115 is configured to provide chunk manager 116 with information about the device (e.g., a device identifier (ID)) and data chunks (e.g., pointers indicating the locations of the data chunks) during each backup and restore process. In such an embodiment, chunk manager 116 uses the provided information to maintain (e.g., create and/or update) reference frequency information stored at storage system 104 (e.g., as part of per device RFIs 117-118 or chunk data structures 131-132).

In one embodiment, at each predetermined trigger event (e.g., after each backup or restore process by a device), chunk manager 116 is configured to determine which data chunks are most frequently referenced by the device that requested the backup or restore. In one embodiment, chunk manager 116 then selects a portion of the most frequently referenced data chunks to be sent to the device. According to one aspect of the invention, for each of the selected data chunks, chunk manager 116 determines (e.g., by inquiring the device) whether the data chunk is already cached at the device (e.g., stored in storage unit 141 or 142). In such an embodiment, chunk manager 116 pushes to the device only the data chunks that are not currently cached at the device.

Figure 4:
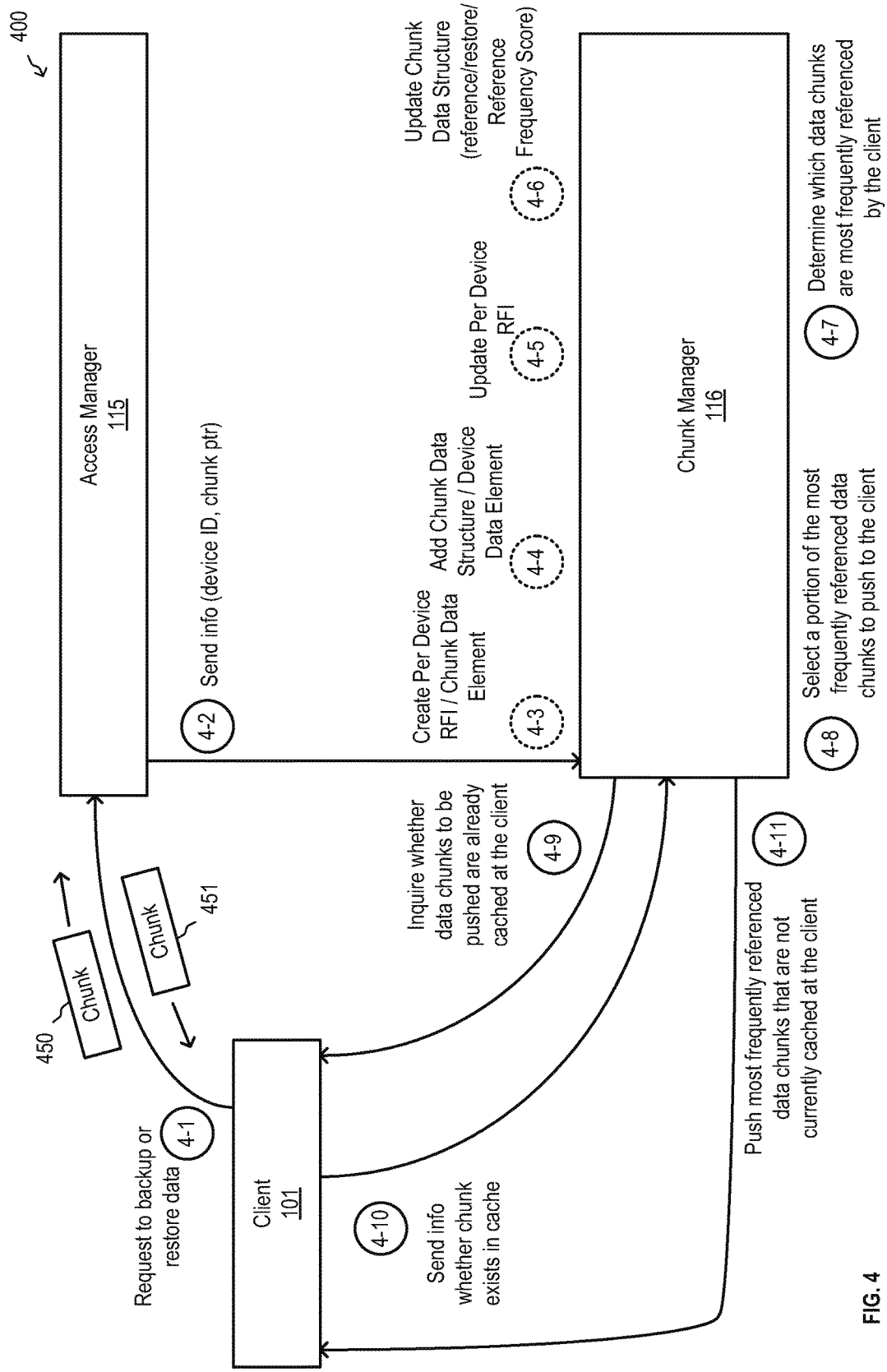
FIG. 4 is a block diagram illustrating a process flow for providing the most frequently referenced data chunks according to one embodiment.

FIG. 4 is a block diagram illustrating system 400 according to one embodiment. System 400 is similar to system 100, except that some details have been omitted in order to avoid obscuring the invention. System 400 illustrates a process flow for pushing most frequently referenced data chunks to a device according to one embodiment. Referring now to FIG. 4. At transaction 4-1, device 101 requests access manager 115 to perform a backup (e.g., of data chunk 450) or restore (e.g., of chunk 451). During a backup, edge device 101 determines if the data chunks already exist at storage system 104. For example, device 101 sends hashes of data chunks to access manager 115 to inquire whether the data chunks corresponding to the hashes exist at storage system 104. In one embodiment, access manager 115 sends information back to device 101 indicating which data chunks currently exist at storage 104. In one embodiment, only data chunks that do not currently exist at storage system 104 are sent to access manager 115 for backup. For data chunks that already exist at storage system 104, edge device 101 only sends the corresponding hashes.

At transaction 4-2, in response to receiving the backup/restore request from device 101, access manager 115 writes the data chunks (e.g., data chunk 450) to storage if it is a backup operation, or read data chunks (e.g., data chunk 451) from storage and send them to device 101 if it is a restore operation. As part of transaction 4-2, access manager 115 sends information to chunk manager 116 for maintaining reference frequency information associated with device 101. In one embodiment, the information includes a device identifier (ID) that identifies network 101. Chunk manager 116 uses the device ID, for example, to determine which per device RFI to create/update, or which device data element of the chunk data structure to create/update. For each data chunk, access manager 115 may also send a chunk pointer indicating the location of where the data chunk is stored. Chunk manager 116 may, for example, store the chunk pointer as part of a chunk pointer field (e.g., chunk pointer 211) of a chunk data element (e.g., chunk data element 201). With a chunk pointer, chunk manager 116 can access the chunk information stored in access manager 115. By way of example, chunk manager 116 obtains such chunk information and hash and pushes them to the edge device. The hash is used by the edge device to check whether the chunk is already cached locally. During the pushing of chunks to the edge device, access manager 115 will push the actual chunk to chunk manager 116. Chunk manager 116, in turn, will push it to the edge device. In one embodiment, this sharing of chunks between access manager 115 and chunk manager 116 can be accomplished by various means, such as a shared memory.

At optional transaction 4-3, chunk manager 116 adds/creates a new per device RFI (e.g., per device RIF 117) to the system. Here, creating a new per device RFI is optional for various reasons. For example, if the per device RFI associated with device 101 already exists, chunk manager 116 will not create another per device RFI for device 106. Further, if storage system 104 is configured to maintain reference frequency information as part of chunk data structures (e.g., chunk data structures 131-132), chunk manager 116 is not required to create a per device RFI for edge device 101. As part of optional transaction 4-3, chunk manager 116 may also create a new chunk data element (e.g., chunk data element 201). Here, creating a new chunk data element is optional because if a chunk data element corresponding to the data chunk to be backed up or restored already exists, chunk manager 116 will not create another chunk data element.

At optional transaction 4-4, chunk manager 116 creates a chunk data structure (e.g., chunk data structure 131) to the system. Here, creating a new chunk data structure is optional for various reasons. For example, if the chunk data structure associated with the data chunk to be backed up or restored already exists, chunk manager 116 will not create another chunk data structure. Further, if storage system 104 is configured to maintain reference frequency information as part of per device RFIs (e.g., per device RFIs 117-118), chunk manager 116 is not required to create a chunk data structure for the data chunk. As part of optional transaction 4-4, chunk manager 116 may also create a new device data element (e.g., device data element 301). Here, creating a new device data element is optional because if a device data element associated with device 101 already exists, chunk manager 116 will not create another device data element to represent device 101.

At optional transaction 4-5, chunk manager 116 updates a per device RFI corresponding to device 101. Here, updating per device RFI is optional if storage system 104 is configured to maintain reference frequency information as part of chunk data structures. In an embodiment where transaction 4-5 is performed, the operations that are performed as part of transaction 4-5 depends on whether device 101 is performing a backup or restore process.

Transaction 4-5 will first be discussed in the context of a backup. Assume, for example, that device 101 is performing a backup of chunk 450. Assume that per device RFI 117 corresponds device 101, and assume further that chunk data element 201 corresponds to chunk 450. In such an example, the reference frequency information updating operations of transaction 4-5 include chunk manager 116 storing the chunk pointer received from access manager 116 as part of chunk pointer 211. Further, chunk manager 116 increments the current value of reference count 213 by 1. Restore count 215 will not be updated because device 101 is not performing a restore in this example. Reference frequency score 217 is updated using a mechanism similar to those described above. For example, reference frequency score 217 is updated to include the product of updated reference count 213 and restore count 215. Next element pointer 219 is not updated unless a new chunk data element is being added. Note that the same data chunk may be backed up multiple times during the same backup operation. In such a case, the reference frequency information included in chunk data element 201 is updated for each backup of the data chunk.

Transaction 4-5 will now be discussed in the context of a restore. Assume, for example, that edge device 101 is performing a restore of chunk 451. Assume that per device RFI 117 is associated with device 101, and assume further that chunk data element 201 is associated with chunk 451. In such an example, the reference frequency information updating operations of transaction 4-5 include chunk manager 116 storing the chunk pointer received from access manager 116 as part of chunk pointer 211. Reference count 213 will not be updated because device 101 is not performing a backup in this example. Further, chunk manager 116 increments the current value of restore count 215 by 1. Reference frequency score 217 is updated using a mechanism similar to those described above. For example, reference frequency score 217 is updated to include the product of reference count 213 and updated restore count 215. Next element pointer 219 is not updated unless a new chunk data element is being added. Note that the same data chunk may be restored multiple times during the same restore operation. In such a case, the reference frequency information included in chunk data element 201 is updated for each restore of the data chunk.

At optional transaction 4-6, chunk manager 116 updates a chunk data structure associated with the data chunk to be backed up or restored. Here, updating a chunk data structure is optional if storage system 104 is configured to maintain reference frequency information as part of per device RFIs (e.g., per device RFIs 117-118). In an embodiment where transaction 4-6 is performed, the operations that are performed as part of transaction 4-6 depends on whether device 101 is performing a backup or restore process.

Transaction 4-6 will first be discussed in the context of a backup. Assume, for example, that device 101 is performing a backup of chunk 450. Assume that chunk data structure 131 is associated with data chunk 450, and assume further that device data element 301 is associated with device 101. In such an example, the reference frequency information updating operations of transaction 4-6 include chunk manager 116 incrementing the current value of reference count 313 by 1. Restore count 315 will not be updated because device 101 is not performing a restore in this example. Reference frequency score 317 is updated using a mechanism similar to those described above. For example, reference frequency score 317 is updated to include the product of updated reference count 313 and restore count 315. Note that the same data chunk may be backed up multiple times during the same backup operation. In such a case, the reference frequency information included in device data element 301 is updated for each backup of the data chunk.

Transaction 4-6 will now be discussed in the context of a restore. Assume, for example, that device 101 is performing a restore of chunk 451. Assume that chunk data structure 131 is associated with data chunk 451, and assume further that device data element 301 is associated with device 101. In such an example, reference count 313 will not be updated because edge device 101 is not performing a backup. Chunk manager 116 increments the current value of restore count 315 by 1. Reference frequency score 317 is updated using a mechanism similar to those described above. For example, reference frequency score 317 is updated to include the product of reference count 313 and updated restore count 315. Note that the same data chunk may be restored multiple times during the same restore operation. In such a case, the reference frequency information included in device data element 301 is updated for each restore of the data chunk.

Optional transactions 43 through 4-6 include operations for creating and updating reference frequency information of data chunks on a per device basis. These transactions are triggered by various events, including for example, each backup and/or restore process. Other events, however, can be used to trigger transactions 4-3 through 46 without departing from the broader scope and spirit of the present invention.

At transaction 4-7, chunk manager 116 determines which data chunks are most frequently referenced by device 101.

In an embodiment where the reference frequency information is maintained as part of per device RFIs (e.g., per device RFIs 117-118), chunk manager sorts the per device RFI associated with device 101 from highest to lowest (or lowest to highest) reference frequency score. Assume, for example, that per device RFI 117 is associated with device 101. As part of transaction 4-7, chunk manager 116 sorts per device RFI 117 based on reference frequency scores 217-218.

As used herein, "sorting a per device RFI" refers to creating a list of data chunks, wherein the data chunks are arranged in an order from highest to lowest (or lowest to highest) reference frequency score. In such an embodiment, not all information of each chunk data element (e.g., chunk data elements 201-202) are required to be included as part of this list of data chunks. For example, reference counts 213-214, restore counts 215-216, and reference frequency scores 217-218 may not be required since the list is already sorted based on the reference frequency score. Alternatively, "sorting" a per device RFI refers to re-arranging the per device RFI itself. In such an embodiment, for example, each of next element pointers 219-220 are updated to re-arrange the per device RFI such that the data chunks are arranged in the highest to lowest (or lowest to highest) reference frequency score. On having ordinary skill in the art would recognize that other mechanisms can be employed to sort the per device RFIs.

In an embodiment where the reference frequency information is maintained as part of the chunk data structures (e.g., chunk data structures 131-132), chunk manager 116 sorts the chunk data structures from highest to lowest (or lowest to highest) reference frequency score. In such an embodiment, as part of transaction 4-7, chunk manager 116 sorts the chunk data structures based on the reference frequency score in each device data element that is associated with device 101.

As used herein, "sorting the chunk data structures" refers to creating a list of data chunks, wherein the data chunks are arranged in an order from highest to lowest (or lowest to highest) reference frequency score. In such an embodiment, not all information of each device data element (e.g., device data elements 301 or 302) are required to be included as part of this list of data chunks. For example, reference counts 313 or 314, restore counts 315 or 316, and reference frequency scores 317 or 318 may not be required since the list is already sorted based on the reference frequency score. By way of further illustration, and not limitation, only information of the chunk itself may be required, such as a chunk pointer (not shown in FIG. 3). One having ordinary skill in the art would recognize that other mechanisms can be employed to sort the chunk data structures.

At transaction 4-8, chunk manager 116 selects a predetermined portion of the most frequently referenced data chunks to push to device 101. In one embodiment, chunk manager 116 is preconfigured with a threshold which places an upper limit on the number of data chunks to push to device 101. In one such embodiment, the threshold is a predetermined percentage of the total number of data chunks that are currently stored at storage system 104. For example, if the predetermined threshold is 10%, and there are one hundred data chunks stored at storage system 104, then as part of transaction 4-8, chunk manager 116 selects the top 10 most frequently referenced data chunks to push to device 101.

At transaction 4-9, chunk manager 116 determines whether the selected data chunks to be pushed have already been cached by edge device 101 (e.g., in storage unit 141). In one embodiment, as part of transaction 4-9, chunk manager 116 sends information of the data chunks to be pushed (e.g., hashes) to device 101, requesting device 101 to provide information on whether the data chunks have been cached by device 101. At transaction 4-10, in response to the request, device 101 sends information back to chunk manager 116 indicating whether each of the respective data chunks identified in the request have been cached (e.g., in storage unit 141). For example, device 101 can send a bit map to chunk manager 116, wherein each bit of the bit map corresponds to a data chunk for which caching information was requested by chunk manager 116. In such an embodiment, a bit having a predetermined value (e.g., 0 or 1) can indicate that the respective data chunk has been cached. At transaction 4-11, chunk manager 116 pushes to device 101 the most frequently referenced data chunks (that are not currently cached in storage unit 141), wherein the number of pushed data chunks does not exceed a predetermined threshold described above. In one embodiment, device 101 caches the received data chunks (e.g., in storage unit 141), such that a local client of the device can access the cached data chunks without having to access storage system 104.

Figure 5:
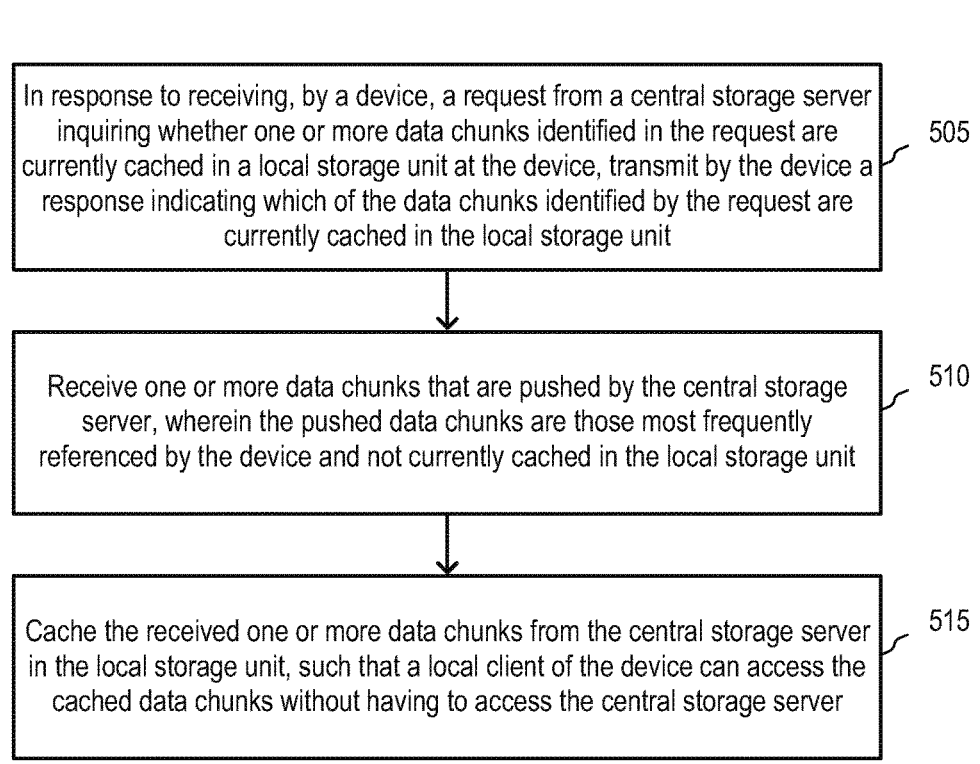
FIG. 5 is a block diagram illustrating flow diagram illustrating a method for caching the most frequently referenced data chunks according to one embodiment.

FIG. 5 is a flow diagram illustrating method 500 for caching most frequently referenced data chunks according to one embodiment. For example, method 500 can be performed by a edge device such as device 101 or 102 (e.g., backup/restore engine 131 or 132, respectively, which can be implemented in software, firmware, hardware, or any combination thereof). Referring now to FIG. 5, at block 505, in response to receiving, by the device, a request from a central storage server (e.g., storage system 104) inquiring whether one or more data chunks identified in the request are currently cached in a local storage unit at the device (e.g., as part of transaction 4-9), transmit by the device a response indicating which of the data chunks identified by the request are currently cached in the local storage unit (e.g., as part of transaction 4-10).

At block 510, the device receives one or more data chunks that are pushed by the central storage server, wherein the pushed data chunks are those most frequently referenced by the device and not currently cached in the local storage unit (e.g., as part of transaction 4-11). At block 515, the device caches the received one or more data chunks from the central storage server in the local storage unit, such that a local client of the device can access the cached data chunks without having to access the central storage server.

Figure 6:
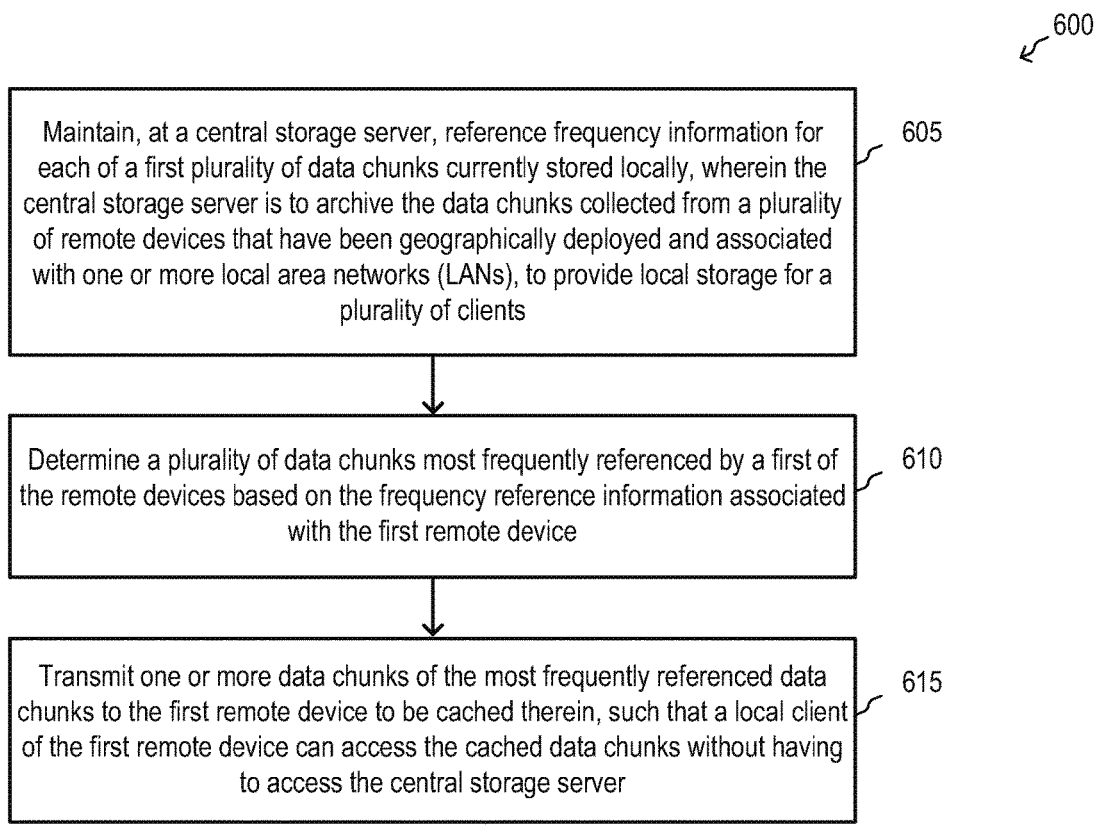
FIG. 6 is a block diagram illustrating flow diagram illustrating a method for providing the most frequently referenced data chunks according to one embodiment.

FIG. 6 is a flow diagram illustrating method 600 for pushing most frequently referenced data chunks to a device according to one embodiment. For example, method 600 can be performed by a central storage server such as storage system 104 (e.g., backup/restore engine 106, which can be implemented as software, firmware, hardware, or any combination thereof). Referring now to FIG. 6, at block 605, the central storage server maintains reference frequency information (e.g., per device RFIs 117-118 or chunk data structures 131-132) for each of a first plurality of data chunks currently stored locally, wherein the central storage server is to archive the data chunks collected from a plurality of remote devices (e.g., devices 101-102) that have been geographically deployed and associated with one or more local area networks (LANs), to provide local storage for a plurality of clients.

At block 610, the central storage server determines a plurality of data chunks most frequently referenced by a first of the remote devices (e.g., device 101) based on the frequency reference information associated with the first remote device. At block 615, the central storage server transmits one or more data chunks of the most frequently referenced data chunks to the first remote device to be cached therein (e.g., as part of transaction 4-11), such that a local client of the first remote device can access the cached data chunks without having to access the central storage server.

Figure 7:
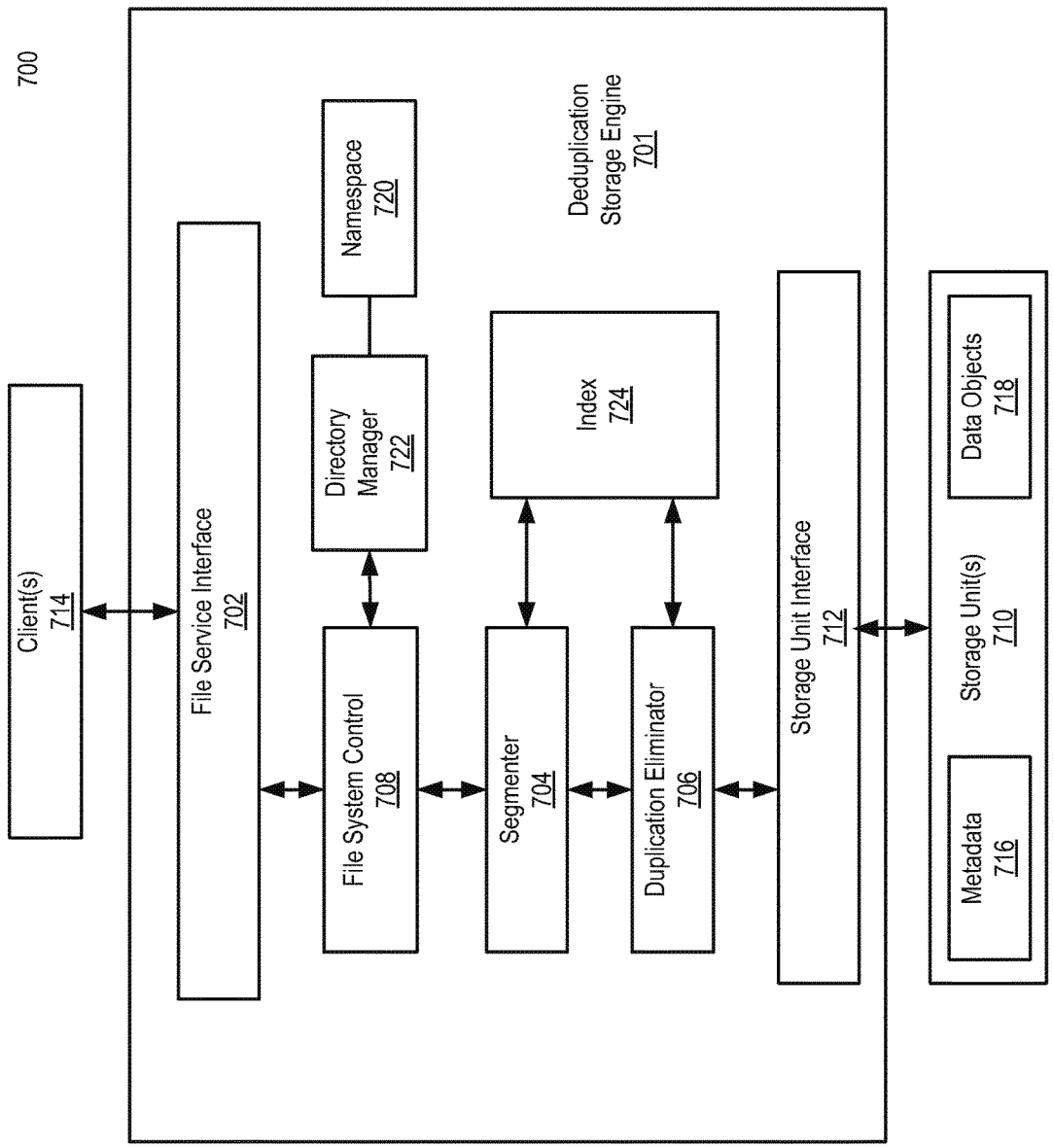
FIG. 7 is a block diagram illustrating a deduplication storage engine which can be used with embodiments of the invention.

FIG. 7 is a block diagram illustrating a deduplication storage system according to one embodiment of the invention. For example, deduplication storage system 700 may be implemented as part of a deduplication storage system as described above, such as, for example, the deduplication storage system as shown in FIG. 1. In one embodiment, storage system 700 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system such as a deduplicating storage system available from EMC® Corporation of Hopkinton, Mass.

In one embodiment, storage system 700 includes a deduplication engine 701 interfacing one or more clients 714 with one or more storage units 710 storing metadata 716 and data objects 718. Clients 714 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network. In one embodiment, one of storage units 710 operates as an active storage to receive and store external or fresh user data, while the another one of storage units 710 operates as a target storage unit to periodically archive data from the active storage unit according to an archiving policy or scheme. Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints contained within data objects 718, where a data object may represent a data segment, a compression region (CR) of data segments, or a container of one or more CRs. Fingerprints are mapped to a particular data object via metadata 716, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 701 includes file service interface 702, segmenter 704, duplicate eliminator 706, file system control 708, and storage unit interface 712. Deduplication storage engine 701 receives a file or files (or data item(s)) via file service interface 702, which may be part of a file system namespace 720 of a file system associated with the deduplication storage engine 701. The file system namespace 720 refers to the way files are identified and organized in the system. An example is to organize the files hierarchically into directories or folders, which may be managed by directory manager 722. File service interface 712 supports a variety of protocols, including a network file system (NFS), a common Internet file system (CIFS), and a virtual tape library interface (VTL), etc.

The file(s) is/are processed by segmenter 704 and file system control 708. Segmenter 704, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 708, also referred to as a file system manager, processes information to indicate the segment(s) association with a file. In some embodiments, a list of fingerprints is used to indicate segment(s) associated with a file. File system control 708 passes segment association information (e.g., representative data such as a fingerprint) to index 724. Index 724 is used to locate stored segments in storage units 710 via storage unit interface 712. Duplicate eliminator 706, also referred to as a segment store, identifies whether a newly received segment has already been stored in storage units 710. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 710 that make up the file. Segments are then packed by a container manager (which may be implemented as part of storage unit interface 712) into one or more storage containers stored in storage units 710. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 702 is configured to communicate with file system control 708 to identify appropriate segments stored in storage units 710 via storage unit interface 712. Storage unit interface 712 may be implemented as part of a container manager. File system control 708 communicates (e.g., via segmenter 704) with index 724 to locate appropriate segments stored in storage units via storage unit interface 712. Appropriate segments are retrieved from the associated containers via the container manager and are used to construct the requested file. The file is provided via interface 702 in response to the request. In one embodiment, file system control 708 utilizes a tree (e.g., a segment tree obtained from namespace 720) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 701 may be implemented in software, hardware, or a combination thereof. For example, deduplication engine 701 may be implemented in a form of executable instructions that can be stored in a machine-readable storage medium, where the instructions can be executed in a memory by a processor.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing most frequently referenced data chunks, the method comprising:
maintaining, at a central storage server, reference frequency information for each of a first plurality of data chunks currently stored locally, wherein the central storage server is to archive the data chunks collected from a plurality of remote devices that have been geographically deployed and associated with one or more local area networks (LANs), to provide local storage for a plurality of clients;
determining a plurality of data chunks most frequently referenced by a first of the remote devices based on the frequency reference information associated with the first remote device; and
transmitting one or more data chunks of the most frequently referenced data chunks to the first remote device to be cached therein, such that a local client of the first remote device can access the cached data chunks without having to access the central storage server.

2. The method of claim 1, further comprising:
in response to receiving, from the first remote device, a request to perform backup or restore of a second plurality of data chunks, updating the reference frequency information associated with the first remote device.

3. The method of claim 2, wherein the reference frequency information for each data chunk is maintained for each of the one or more of remote devices.

4. The method of claim 3, wherein the reference frequency information for each data chunk includes a reference count and a restore count, wherein the reference count indicates how many times the data chunk is referenced by the corresponding remote device, and the restore count indicates how many times the data chunk has been restored by the corresponding remote device.

5. The method of claim 4, wherein determining the plurality of data chunks most frequently referenced by the first remote device comprises calculating a score based on the reference count and the restore count.

6. The method of claim 5, wherein transmitting one or more data chunks to the first remote device comprises selecting a predetermined number of one or more data chunks most frequently referenced by the first remote device.

7. The method of claim 6, wherein transmitting the one or more data chunks to the first remote device further comprises:
inquiring the first remote device whether each data chunk of the selected data chunks currently exists in a storage unit of the first remote device; and
transmitting each data chunk of the selected data chunks that currently does not exist in the storage unit of the first remote device.

8. The method of claim 7, wherein in response to determining a reference frequency information corresponding to a data chunk of the second plurality of data chunk does not exist, adding a new frequency reference information for that corresponding data chunk for each of the one or more remote devices.

9. A non-transitory computer-readable medium having computer instructions stored therein, which when executed by a processor, cause the processor to perform operations comprising:
maintaining, at a central storage server, reference frequency information for each of a first plurality of data chunks currently stored locally, wherein the central storage server is to archive the data chunks collected from a plurality of remote devices that have been geographically deployed and associated with one or more local area networks (LANs), to provide local storage for a plurality of clients;

determining a plurality of data chunks most frequently referenced by a first of the remote devices based on the frequency reference information associated with the first remote device; and transmitting one or more data chunks of the most frequently referenced data chunks to the first remote device to be cached therein, such that a local client of the first remote device can access the cached data chunks without having to access the central storage server.

10. The non-transitory computer-readable medium of claim 9, further comprising:

in response to receiving, from the first remote device, a request to perform backup or restore of a second plurality of data chunks, updating the reference frequency information associated with the first remote device.

11. The non-transitory computer-readable medium of claim 10, wherein the reference frequency information for each data chunk is maintained for each of the one or more of remote devices.

12. The non-transitory computer-readable medium of claim 11, wherein the reference frequency information for each data chunk includes a reference count and a restore count, wherein the reference count indicates how many times the data chunk is referenced by the corresponding remote device, and the restore count indicates how many times the data chunk has been restored by the corresponding remote device.

13. The non-transitory computer-readable medium of claim 12, wherein determining the plurality of data chunks most frequently referenced by the first remote device comprises calculating a score based on the reference count and the restore count.

14. The non-transitory computer-readable medium of claim 13, wherein transmitting one or more data chunks to the first remote device comprises selecting a predetermined number of one or more data chunks most frequently referenced by the first remote device.

15. The non-transitory computer-readable medium of claim 14, wherein transmitting the one or more data chunks to the first remote device further comprises:

inquiring the first remote device whether each data chunk of the selected data chunks currently exists in a storage unit of the first remote device; and transmitting each data chunk of the selected data chunks that currently does not exist in the storage unit of the first remote device.

16. The non-transitory computer-readable medium of claim 15, wherein in response to determining a reference frequency information corresponding to a data chunk of the second plurality of data chunk does not exist, adding a new frequency reference information for that corresponding data chunk for each of the one or more remote devices.

17. A central storage server, comprising:

a network interface configured to transmit and receive data chunks;

a chunk manager, coupled to the network interface, configured to:

maintain reference frequency information for each of a first plurality of data chunks currently stored locally, wherein the central storage server is to archive the data chunks collected from a plurality of remote devices that have been geographically deployed and associated with one or more local area networks (LANs), to provide local storage for a plurality of clients;

determine a plurality of data chunks most frequently referenced by a first of the remote devices based on the frequency reference information associated with the first remote device; and transmit one or more data chunks of the most frequently referenced data chunks to the first remote device to be cached therein, such that a local client of the first remote device can access the cached data chunks without having to access the central storage server.

18. The central storage server of claim 17, wherein the chunk manager is further configured to in response to receiving, from the first remote device, a request to perform backup or restore of a second plurality of data chunks, update the reference frequency information associated with the first remote device.

19. The central storage server of claim 18, wherein the reference frequency information for each data chunk is maintained for each of the one or more of remote devices.

20. The central storage server of claim 19, wherein the reference frequency information for each data chunk includes a reference count and a restore count, wherein the reference count indicates how many times the data chunk is referenced by the corresponding remote device, and the restore count indicates how many times the data chunk has been restored by the corresponding remote device.

21. The central storage server of claim 20, wherein determining the plurality of data chunks most frequently referenced by the first remote device comprises calculating a score based on the reference count and the restore count.

22. The central storage server of claim 21, wherein transmitting one or more data chunks to the first remote device comprises selecting a predetermined number of one or more data chunks most frequently referenced by the first remote device.

23. The central storage server of claim 22, wherein transmitting the one or more data chunks to the first remote device further comprises:

inquiring the first remote device whether each data chunk of the selected data chunks currently exists in a storage unit of the first remote device; and transmitting each data chunk of the selected data chunks that currently does not exist in the storage unit of the first remote device.

24. The central storage server of claim 23, wherein the chunk manager is further configured to in response to determining a reference frequency information corresponding to a data chunk of the second plurality of data chunk does not exist, add a new frequency reference information for that corresponding data chunk for each of the one or more remote devices.

* * * * *